April 25, 1939.  W. A. DUFFIELD  2,156,040

FLUID COUPLING

Filed March 1, 1937

INVENTOR
William A. Duffield
BY
ATTORNEY

Patented Apr. 25, 1939

2,156,040

UNITED STATES PATENT OFFICE 2,156,040

FLUID COUPLING

William A. Duffield, Montreal, Quebec, Canada, assignor to Modern Equipment Limited, Montreal, Quebec, Canada, a company Application March 1, 1937, Serial No. 128,512

7 Claims. (Cl. 60—54)

This invention relates to improvements in fluid couplings and particularly to those in which power is transmitted by a fluid from an impeller member to a runner member by its circulation through vaned channels in both members.

The object of the invention is to provide means whereby the fluid may be evacuated from the working circuit of the members and returned thereto.

A further object is to provide a fluid clutch which is adapted to over-run under certain conditions.

Reference is made to the accompanying drawing in which.

Figure 1:
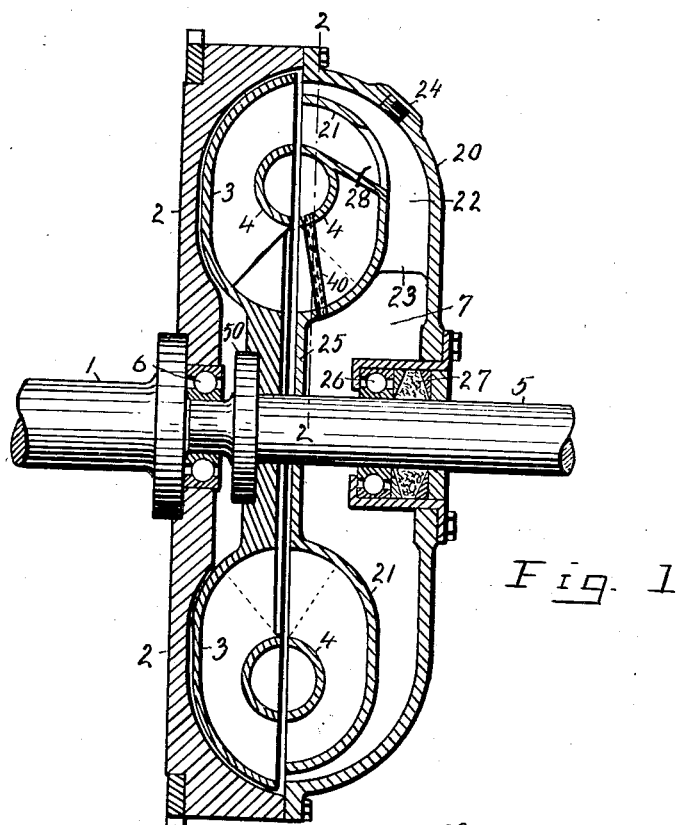
Figure 1 is a vertical cross section of the clutch.

As shown in Figure 1, the fluid coupling is of the Fottinger type, the drive shaft 1 is bolted to a cover or bowl 2 which may be a fly wheel. Secured to the bowl 2 at its periphery is the impeller member which comprises an outer shell 20 and an inner shell 21 connected by vanes 23, forming the by-pass passage 22. A driven shaft 5 journalled in bearings 6 in the bowl 2 supports a bearing 26 and packing ring 27 of the outer shell 20.

The space between the inner portion of the shell 21 with its flange 25 and the inner portion of the shell 20 forms a central reservoir around the shaft 5.

The runner member 3 which is larger than the inner shell 21 is bolted to a flange 50 on the driven shaft 5. The by-pass 22 therefore opens directly into the runner 3. The inner shell 21 of the impeller has a flange 25 around the driven shaft 5. Both impeller and runner have central core members 4 which together form the inner walls of the fluid working circuit, and are connected to the outer walls by the usual series of vanes.

The impeller has one or more air passages 40 from the core member 4 to the reservoir 7 around the driven shaft 5.

Figure 2:
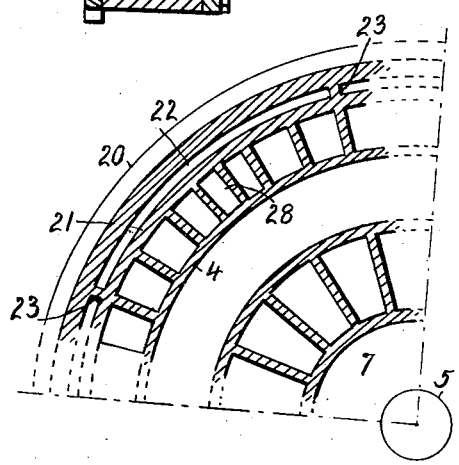
Figure 2 is a partial cross section on the lines 2—2 of Figure 1.

As shown in Figure 2 the by-pass 22 between the outer and inner shells 20—21 of the impeller has a series of vanes 23 extending towards the reservoir 7.

In order to provide more rapid flow from the working circuit to the passage 22 leading to the reservoir 7 direct passages 28 through the impeller may be provided. These are shown in Figures 1 and 2.

A plug 24 is provided in the outer shell 20 through which to fill the coupling with fluid as required.

The operation of the coupling is as follows:

A suitable quantity of fluid having been fed to the reservoir and its connections, the drive shaft is rotated in either direction. This rotates the impeller and causes the fluid to flow from the reservoir through the by-pass channels into the working circuit. The filling of the working circuit causes the fluid to circulate and couple the impeller to the runner and rotate the runner in the same direction as the impeller.

The driven shaft will then be driven at approximately the same speed as that of the drive shaft.

Now if the speed of the rotation of the impeller slows down below that of the runner from any cause such as coasting, the runner will become the temporary impeller and cause the fluid in the working circuit to flow in the opposite direction. The runner will then be over-running the impeller.

When the fluid in the working circuit begins to flow in the reverse direction a portion of it will pass through the by-pass passage into the reservoir. The slip between the impeller and the runner will increase to maximum and the runner will rotate freely. If the impeller is now speeded up to rotate faster than the runner, or if the runner is slowed down to rotate slower than the impeller, the fluid will return from the reservoir into the working circuit and the coupling will again become closed.

By means of the air passages any air will pass freely from the reservoir to the interior of the working circuit and vice-versa and prevent any air lock or hindrance to the filling and emptying of the fluid.

By means of the additional inlets to the by-pass channels, the transfer of the fluid in either direction is expedited and made more efficient.

What I claim is:

1. In a fluid coupling of the type specified, having vaned impeller and runner members, the impeller member having a central enclosed reservoir and a by-pass passage from the reservoir opening directly into the runner member.

2. In a fluid coupling of the type specified, having vaned impeller and runner members, the impeller member having a central enclosed reservoir and a by-pass passage on the outside of the impeller from the reservoir opening directly into the runner member.

3. In a fluid coupling of the type specified, having vaned impeller and runner members with core members, the impeller member having a central enclosed reservoir and a by-pass on the outside of the impeller from the reservoir opening directly into the runner member and air tubes between the core member of the impeller and the reservoir.

4. In a fluid coupling of the type specified having vaned impeller and runner members with core members, the combination with a drive shaft and a driven shaft, of a bowl bolted to the drive shaft, the impeller member bolted to the bowl, comprising an inner shell and an outer shell connected by vanes to form a by-pass passage opening directly into the runner member, a reservoir formed by extensions of shells toward the driven shaft, open to the by-pass passage, the runner member having the diameter of the outer shell, bolted to a flange of the driven shaft.

5. In a fluid coupling of the type specified, having vaned impeller and runner members with core members, the combination with a drive shaft and a driven shaft of a bowl bolted to the drive shaft, the impeller member bolted to the rim of the bowl, comprising an inner shell and an outer shell connected by vanes to form a by-pass passage which opens directly into the runner member, extensions of the shells toward the driven shaft forming a reservoir open to the by-pass passage, the runner member having the diameter of the outer shell, bolted to a flange on the driven shaft and air passages between the reservoir and the core member of the impeller.

6. In a fluid coupling of the type specified, having vaned impeller and runner members, the combination with a drive shaft and a driven shaft of an impeller member secured to the drive shaft, comprising fluid circulating passages and an outside vaned by-pass passage with extensions towards the driven shaft forming a reservoir, and having additional passages through the fluid circulating passages to the by-pass passage, and a runner member secured to the driven shaft extending over and opening directly into the outlet of the by-pass passage.

7. In a fluid coupling of the type specified, having vaned impeller and runner members, the combination with a drive shaft and a driven shaft of an impeller member secured to the drive shaft, comprising fluid circulating passages and an outside vaned by-pass passage with extensions towards the driven shaft forming a reservoir, and a runner member secured to the driven shaft extending over and opening directly into the outlet of the by-pass passage.

WILLIAM A. DUFFIELD.